UNITED STATES PATENT OFFICE

2,124,851

HALOGEN-SUBSTITUTED ALCOHOLS AND A PROCESS OF PREPARING THEM

Wilhelm Fitzky, Frankfort-on-the-Main-Hochst, Germany, assignor to I. G. Farbenindustrie Aktiengesellschaft, Frankfort - on - the - Main, Germany No Drawing. Application October 13, 1936, Serial No. 105,438. In Germany October 23, 1935

10 Claims. (Cl. 260—156)

The present invention relates to halogen-substituted alcohols and a process of preparing them.

It has been found that hitherto difficultly accessible or unknown halogen-substituted alcohols may be obtained by addition to an aliphatic carbon chain having one or more double bonds, of formaldehyde, or substances which yield formaldehyde, and hydrogen halide or the products of the mutual reaction of these two bodies. As a primary product of the reaction of formaldehyde and hydrogen halide there may be supposed to be produced the halogen methyl alcohol, which cannot be isolated (compare, "Annalen", 316, 177). The course of the reaction of the addition is then the following, if hydrogen chloride is used:

In the formula $R_1$, $R_2$, $R_3$, $R_4$ stand for hydrogen or any substituents, such as alkyl, alkylene, halogen, alkoxy, aryl, aralkyl, hydroaryl, —CO—alkyl, aroyl, —COOH, —COOR₅ ($R_5$ being alkyl or aryl), a heterocyclic residue or the like, furthermore $R_1+R_2$ together for oxygen. The two carbon atoms may also be members of an isocyclic or a heterocyclic ring system. The addition occurs best in the presence of water, this being due to the fact that the further products of the reaction of formaldehyde and, for instance, hydrogen chloride, such as dichloro-dimethyl ether and dichloro-methylal, hydrolytically decompose in an easy manner in the presence of water during which operation there are again produced formaldehyde and hydrogen chloride and, secondarily, chloromethyl-alcohol. The manufacture of the halogen alkyl alcohols may be promoted by the addition of a catalyst. This addition is, however, not required in all cases. In some cases the temperature of the reaction is decreased thereby. The metal halides of the second group of the periodic system have, for instance, a catalytically promoting action: such as zinc chloride, calcium chloride, mercury chloride, strontium chloride, barium chloride and furthermore iron chloride and iron bromide. As during the reaction gases are transformed into liquids, that is a decrease in volume occurs, the application of pressure which may be increased up to 200 atmospheres has a favorable action. The substances may be caused to react at ordinary or at a raised temperature, for instance at 100° C. to about 200° C. Besides the starting materials named in the examples there may be used butadiene, cyclohexene, ketene, vinyl methyl ether, crotonic acid. Instead of hydrogen chloride hydrogen bromide may be caused to act upon the olefinic compound together with formaldehyde. In this case the corresponding alcohols substituted by bromine are obtained.

The halogen-substituted alcohols thus obtained, for instance the γ-chloro-substituted alcohols are important industrial products. Partly they are used as solvents and partly they may serve as parent materials for important compounds in the manufacture of artificial materials, for instance caoutchouc.

The following examples serve to illustrate the invention, but they are not intended to limit it thereto:

1. 1,000 grams of formaldehyde solution of 30 per cent strength are saturated with hydrogen chloride and in a pressure vessel about 500 grams of propylene are gradually forced, at 50° C., while stirring, into the saturated solution. The product of the reaction is distilled with steam and by adding potassium carbonate to the distillate the γ-chlorobutanol produced of the formula

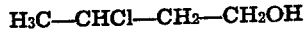

is caused to separate. In order to purify the product from a small amount of a polymerization product and from ethers which are likewise obtained, it is fractionally distilled. The γ-chlorobutanol boils at a temperature between 170° C. and 180° C. The constitution was proved by splitting off the hydrogen chloride and transforming the butenol obtained into butadiene (with dilute acid, while applying pressure). The melting point of the butadiene-tetrabromide made for the purpose of identification is 117° C.

2. A gaseous equimolecular mixture of propylene and hydrogen chloride is passed in a slow current over 300 grams of para-formaldehyde which are heated in a glass vessel to 50° C. The solid mass, at first gently heated, becomes liquid gradually. The product of the reaction is distilled with steam, the distillate is extracted with ether and the oil which remains after the ether has been evaporated is fractionally distilled. During the first runnings large quantities of unchanged formaldehyde distil. The same γ-chlorobutanol is obtained as in Example 4.

Instead of using dry para-formaldehyde, the gaseous mixture may be introduced, while stirring, into a suspension of para-formaldehyde in carbon tetrachloride.

3. 500 grams of zinc chloride are dissolved in 1000 grams of an aqueous formaldehyde solution of 30 per cent strength. This solution is then saturated with hydrogen chloride and, in an autoclave having an agitator, ethylene is forced into the solution until a pressure of 60 atmospheres to 70 atmospheres is attained. The whole is stirred for 12 hours at ordinary temperature and during this operation fresh ethylene is constantly added to reproduce the initial pressure and to take the place of that consumed. After the excess of ethylene has been blown off, the aqueous portion is separated from the mixture, the oil is dissolved, as far as possible, in pure water, all the aqueous solutions are distilled with steam and after the distillate has been salted out with potash it is extracted with ether. After the ether has been evaporated, the 3-chloropropanol-1 of the formula:

ClCH₂—CH₂—CH₂OH is purified by distillation (boiling point 160° C. to 163° C.).

4. In a tube 75 grams of a formaldehyde solution which has been saturated with hydrogen chloride, are mixed with 30 grams of crystallized calcium chloride, and 20 grams of vinyl chloride are then condensed in the tube by cooling to a low temperature. The tube is sealed and heated for 15 hours to 50° C. The product of the reaction, which for the most part is soluble in water, is isolated and fractionally distilled as described in Example 3. The new 3,3-dichloropropanol-1 of the formula:

Cl₂CH—CH₂—CH₂OH is obtained as main product; said product has a boiling point of about 178° C. to 179° C. In addition the β-dichlorhydrin of the formula:

ClCH₂—CHCl—CH₂OH is obtained; it has a boiling point of 182° C. Both products are limpid. For a further identification beta-dichlorhydrin was converted into epichlorhydrin.

By the addition of chloromethyl alcohol to isobutylene it is possible in a similar manner to obtain a liquid, limpid alcohol of the following probable constitution:

$$\text{H}_3\text{C}-\underset{\underset{\text{CH}_3}{|}}{\text{C}}\text{Cl}-\text{CH}_2-\text{CH}_2\text{OH}$$

which is intended to be used for the manufacture of isoprene.

I claim:
1. The process which comprises causing formaldehyde and hydrogen halide to act upon a low-molecular aliphatic compound containing an olefinic double bond.
2. The process which comprises causing formaldehyde and hydrogen chloride to act upon a low-molecular aliphatic compound containing an olefinic double bond.
3. The process which comprises causing an addition product of formaldehyde and hydrogen chloride to act upon a low-molecular aliphatic compound containing an olefinic double bond.
4. The process which comprises causing formaldehyde and hydrogen chloride to act in the presence of water upon a low-molecular aliphatic compound containing an olefinic double bond.
5. The process which comprises causing formaldehyde and hydrogen chloride to act upon a low-molecular aliphatic compound containing an olefinic double bond in the presence of a catalyst of the group consisting of the metal halogenides of the second group of the periodic system and iron chloride.
6. The process which comprises causing an aqueous solution of formaldehyde, saturated with hydrogen chloride to act upon a low-molecular aliphatic compound containing an olefinic double bond.
7. The process which comprises causing an aqueous solution of formaldehyde, saturated with hydrogen chloride to act upon propylene at a temperature of about 50° C.
8. The process which comprises causing an aqueous solution of formaldehyde, saturated with hydrogen chloride to act upon vinylchloride at a temperature of about 50° C. and in the presence of calcium chloride.
9. The process which comprises causing an aqueous solution of formaldehyde, saturated with hydrogen chloride to act upon ethylene at a pressure of about 60 atmospheres to about 70 atmospheres at room temperature and in the presence of zinc chloride.
10. The 3,3-dichloropropanol-1 of the following formula:

Cl₂CH—CH₂—CH₂OH said product having a boiling point of about 178° C. to about 179° C. and being a limpid clear liquid.

WILHELM FITZKY.